United States Patent
Kojima et al.

(10) Patent No.: US 7,717,490 B2
(45) Date of Patent: May 18, 2010

(54) SEAT SLIDE DEVICE FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 14 days.

(21) Appl. No.: 12/054,772

(22) Filed: Mar. 25, 2008

(65) Prior Publication Data

US 2008/0238127 A1 Oct. 2, 2008

(30) Foreign Application Priority Data

Mar. 29, 2007 (JP) ............... 2007-089486

(51) Int. Cl.
B60N 2/02 (2006.01)

(52) U.S. Cl. .................... 296/65.13; 297/341

(58) Field of Classification Search ............. 296/65.13, 296/65.14, 65.09; 248/429, 430
See application file for complete search history.

(56) References Cited

U.S. PATENT DOCUMENTS

| 4,449,752 | A | * | 5/1984 | Yasumatsu et al. ........ 297/341 |
| 4,881,774 | A | * | 11/1989 | Bradley et al. ........... 297/341 |
| 5,052,751 | A | * | 10/1991 | Hayakawa et al. ........ 297/341 |
| 5,100,092 | A | * | 3/1992 | Sovis ...................... 248/429 |
| 5,352,019 | A | | 10/1994 | Bauer et al. |
| 5,605,377 | A | * | 2/1997 | Tame ...................... 297/341 |
| 5,740,999 | A | * | 4/1998 | Yamada .................... 248/429 |
| 6,098,946 | A | * | 8/2000 | Sechet et al. .............. 248/424 |
| 6,227,596 | B1 | | 5/2001 | Foucault et al. |
| 6,341,819 | B1 | * | 1/2002 | Kojima et al. ............. 297/341 |
| 6,830,296 | B2 | * | 12/2004 | Kojima .................... 297/341 |
| 6,945,607 | B2 | * | 9/2005 | Kojima .................... 297/341 |
| 7,097,250 | B2 | * | 8/2006 | Rausch et al. ............ 297/341 |
| 7,140,683 | B2 | * | 11/2006 | Rausch et al. ............ 297/341 |
| 7,318,573 | B2 | * | 1/2008 | Yamada et al. ............ 248/424 |
| 2005/0103968 | A1 | * | 5/2005 | Yamada et al. ............ 248/429 |
| 2008/0238127 | A1 | * | 10/2008 | Kojima et al. ............ 296/65.13 |
| 2009/0058169 | A1 | * | 3/2009 | Soga ..................... 297/463.1 |

FOREIGN PATENT DOCUMENTS

JP 11-321393 11/1999

* cited by examiner

*Primary Examiner*—Kiran B. Patel
(74) *Attorney, Agent, or Firm*—Oblon, Spivak, McClelland, Maier & Neustadt, L.L.P.

(57) ABSTRACT

A seat slide device for a vehicle includes a lower rail, an upper rail movable relative to the lower rail and a lock member for restricting the relative movement of the upper and lower rails. The restriction of the relative movement can be released and the lock-released position can be retained. The seat slide device further includes a memory piece detachably engaged with the lower rail and provided in a direction separating from the lower rail and engaging therewith when a seatback is reclined forward, wherein the memory piece is moved in association with the movement of the upper rail by retaining the memory piece at the receiving portion and the shaped portion when the memory piece is separated from the lower rail and wherein the memory piece is engaged with the lower rail at the engaging portion when the memory piece is engaged with the lower rail.

9 Claims, 5 Drawing Sheets

SEAT SLIDE DEVICE FOR VEHICLE

CROSS REFERENCE TO RELATED APPLICATIONS

This application is based on and claims priority under 35 U.S.C. §119 to Japanese Patent Application 2007-089486, filed on Mar. 29, 2007, the entire content of which is incorporated herein by reference.

FIELD OF THE INVENTION

This invention generally relates to a seat slide device for a vehicle, and more particularly to a seat slide device with a lower rail and an upper rail movable relative to the lower rail.

The seat slide used for a vehicle is disclosed in a Japanese patent publication 11-321393 A. In the document, the seat slide device includes a lower rail secured to the vehicle floor and an upper rail secured to the vehicle seat and slidably movable relative to the lower rail for adjusting the position of the vehicle seat in a longitudinal direction of the vehicle. The seat slide device in this document further includes a lock member for restricting the relative movement between the upper and lower rails. An occupant of the seat can release the locked condition by applying lock release force to the lock member.

The seat slide includes a seat position adjusting mechanism. The mechanism includes a memory-retaining runner, which moves on the lower rail in accordance with the movement of the upper rail. The seat position is adjusted to move the seat relative to the vehicle floor by releasing the lock member. The occupant of the seat achieves the releasing of the lock member by moving the seat to the desired position. The memory-retaining runner is fixed to the lower rail upon walk-in operation. The walk-in operation is achieved when the seatback is reclined forward to allow an occupant of the rear seat to be easily moved in by locking or releasing the lock member.

After the occupant walked in and seated, for example, on the rear seat, the upper rail (in other words, the seat cushion) is moved to a memory position where the memory-retaining runner engages with the upper rail, the lock position is memorized to lock the relative movement of the seat. Further, after the walk-in operation, if the seatback is returned to the original position before the upper rail reaches to the memory position, the lock member also returns to restrict the movement of the upper rail. The memory-retaining runner is not engaged with the upper rail. After that, when the upper rail is moved to the memory position by the normal slide operation, the memory retaining runner returns to engage with the upper rail.

BACKGROUND

In the conventional seat slide device as explained above, the memory retaining runner on the lower rail moves in association with the movement of the upper rail upon normal seat slide operation. Accordingly, if some obstacles, such as for example, a bolt for fastening the lower rail to the floor exists on the moving track of the memory retaining runner, the movement of the runner is restricted by the bolt to restrict also the movement of the upper A need thus exists for a seat slide device, which is not susceptible to the drawback, mentioned above.

SUMMARY OF THE INVENTION

According to an aspect of the present invention, a seat slide device for a vehicle includes a lower rail adapted to be mounted on a vehicle floor, an upper rail adapted to be mounted on a vehicle seat and movable relative to the lower rail, a lock member for locking the relative movement between the lower rail and the upper rail, a memory piece mounted in the lower rail to be engageable with and disengageable from the lower rail, and a first receiving portion provided on the upper rail and moving the memory piece in a relative movement direction of the upper rail by following the movement of the upper rail by contacting with the memory piece and allowing the memory piece to move relative to the upper rail by releasing the contact with memory piece.

According to another aspect of the present invention, a seat slide device for a vehicle includes a lower rail adapted to be mounted on a vehicle floor, an upper rail adapted to be mounted on a vehicle seat and movable relative to the lower rail, a lock member for locking the relative movement between the lower rail and the upper rail, a memory piece mounted in the lower rail to be engageable with and disengageable from the lower rail, a release lever releasing the restriction of the relative movement between the lower rail and the upper rail by the lock member in association with a frontward reclining movement of a seatback of the vehicle seat, a memory piece release lever operatively connected with the release lever and engaging the memory piece with the lower rail under the restriction condition of the relative movement between the lower rail and the upper rail by rotational operation of the release lever being released, a release handle provided separately from the release lever and connected to the lock member for releasing the restriction of the relative movement between the lower rail and the upper rail by the lock member, and a first receiving portion provided on the upper rail and moving the memory piece in a relative movement direction of the upper rail by following the movement of the upper rail by contacting with the memory piece and allowing the memory piece to move relative to the upper rail by releasing the contact with memory piece.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 5:
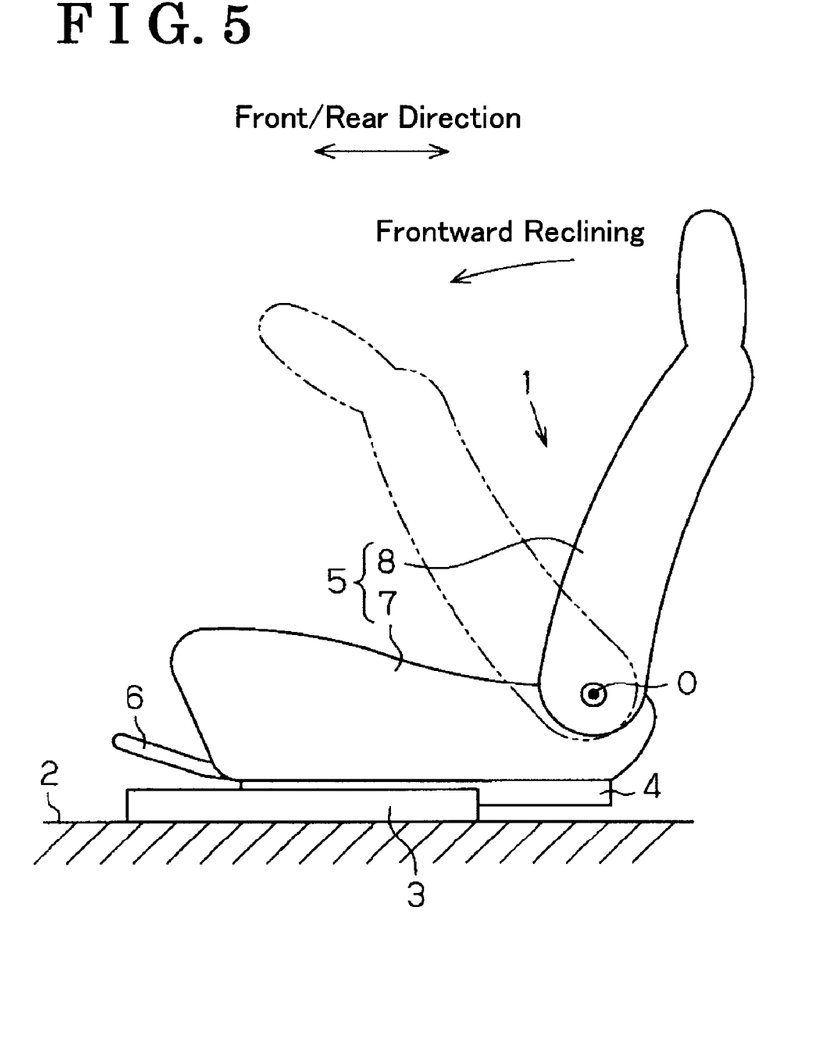

As illustrated in FIG. 5, the vehicle seat 1 is usually installed in a front side of the vehicle for an occupant seating at the front side, such as a driver of the vehicle. A lower rail 3 is secured to a vehicle floor 2 in a front/rear direction of the vehicle and an upper rail 4 is mounted on the lower rail for relative sliding movement.

The lower and upper rails 3 and 4 are usually provided pairs in a vehicle width direction (perpendicular to the paper surface), but only one side (left side) is shown for simple explanation purpose. A seat 5 is secured to the upper rail 4. The seat 5 includes a seat cushion 7 for an occupant to be seated thereon and a seatback 8 rotatably supported on the seat cushion for relative rotation thereto about the rotational axis O at the rear side end of the seat cushion. The relative sliding movement between the upper and lower rails is basically restricted and a release handle 6 is provided for releasing the restricted condition between the lower and upper rails 4 and 3.

Figure 1:
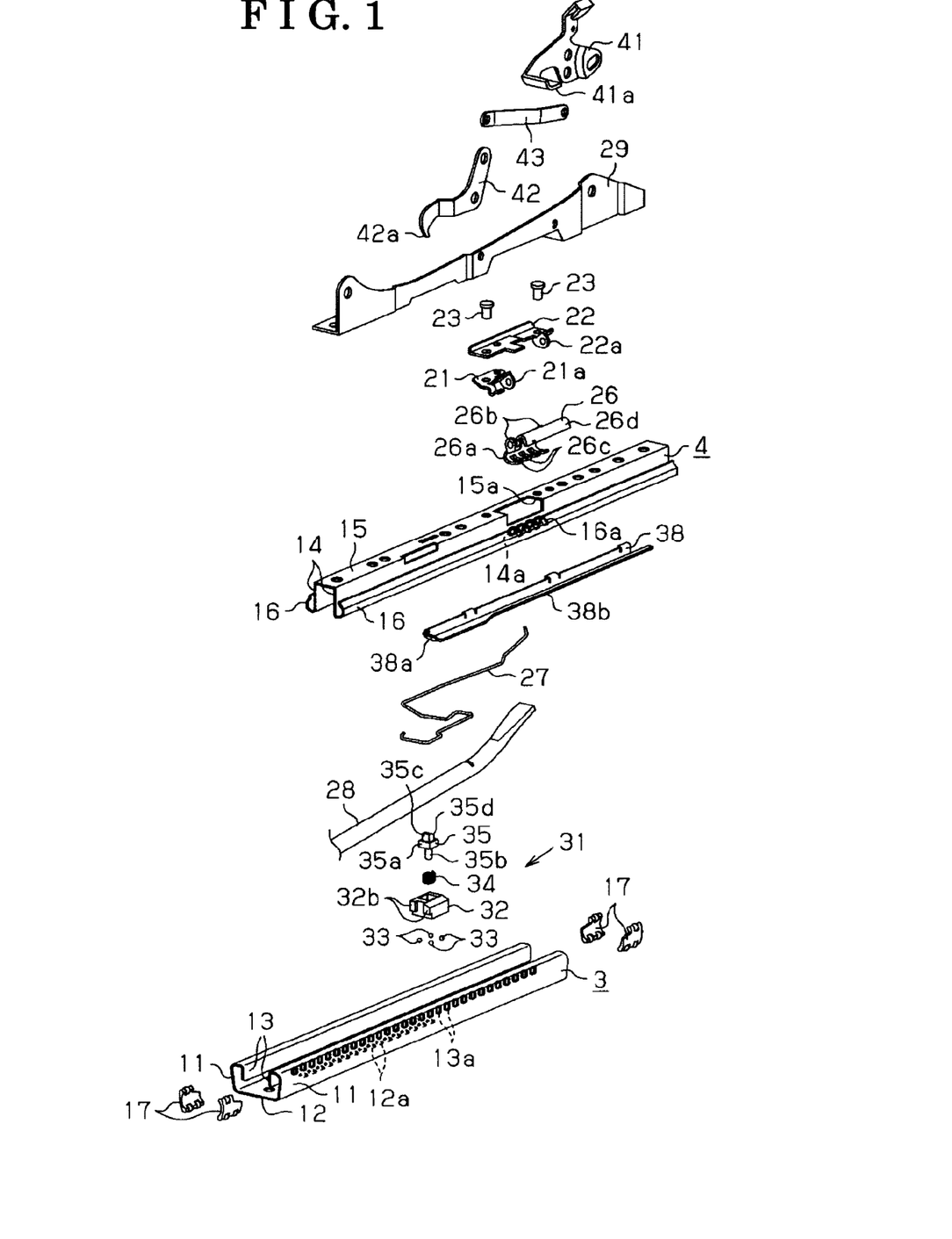
FIG. 1 is an exploded perspective view of a vehicle seat slide device according to one embodiment of the invention.
Figure 2A:
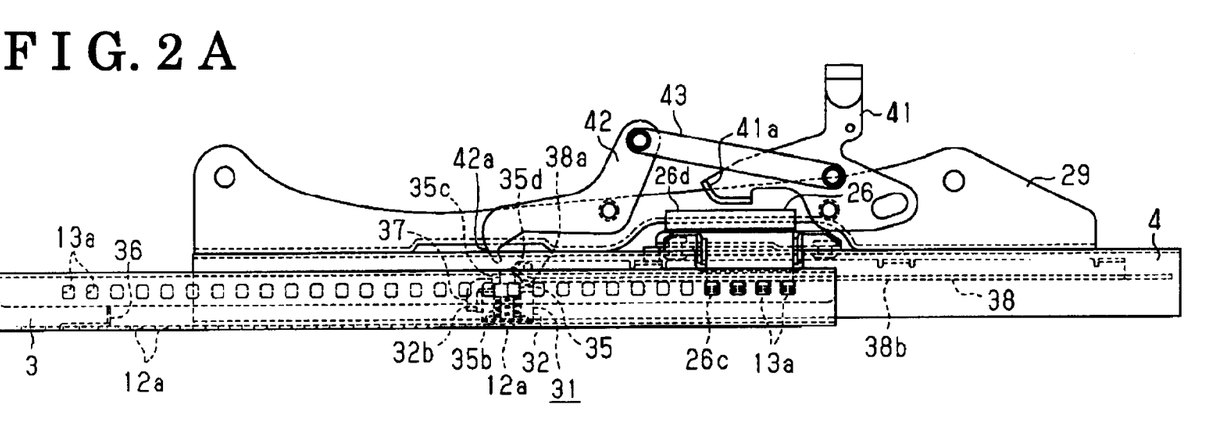
FIG. 2a is a side view of the seat slide device according to FIG. 1.
Figure 2B:
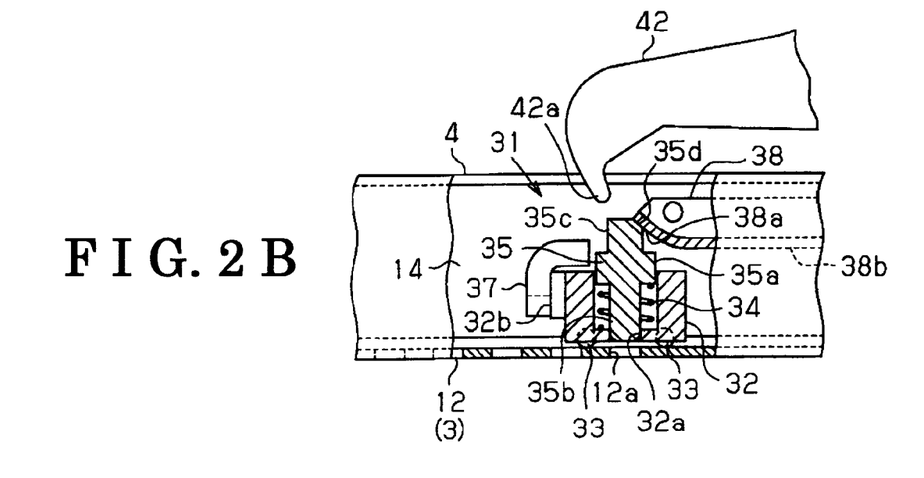
FIG. 2b is a cross sectional view of cross sectional view of the seat slide device according to FIG. 1.

Explaining now the structure of the seat slide device with reference to FIGS. 1 and 2, the lower rail 3 includes a pair of side walls 11 provided at both ends in a width direction, a bottom wall 12 connecting the both side walls 11 and a pair of bent walls 13 provided at an upper end (tip end) of each side wall 11 and bent toward inside of the rail in a width direction and folded again towards the bottom wall 12 thereof as shown in FIG. 1.

On the other hand, the upper rail 4 includes a pair of side walls 14 provided downward from a top wall (cover) 15 connecting the sidewalls 14 at both ends in a width direction. The upper rail 4 further includes a pair of bent walls 16 provided at the lower end of each sidewall 14 and bent towards outside of the rail in a width direction and folded again towards the top wall 15 as shown in FIG. 1.

The lower rail 3 has a U-shape in cross section and the upper rail 4 has a reverse U-shape in cross section and the lower and upper rails 3 and 4 are engaged at the bent walls 13 and 16 for preventing vertical loosening of the engagement of the two rails 3 and 4.

A pair of drive member 17 (shoes) is provided between the bent walls 13 and 16 for the relative movement in a longitudinal direction of the vehicle between the upper and lower rails 4 and 3. In other words, the upper rail 4 moves along the lower rail 3 in the longitudinal direction.

A plurality of circular detent holes 12a is formed at the bottom wall 12 of the lower rail 3 and each hole is separated with a predetermined distance apart from one another in a longitudinal direction. A plurality of rectangular lock holes 13a is provided at one side of the bent walls 13 and each hole is separated with the predetermined distance apart from one another in a longitudinal direction. A plurality of insertion holes 14a is provided at one side of the sidewalls 14 (right side as viewed in FIG. 1) and each hole is separated with the predetermined distance apart from one another in a longitudinal direction. The insertion holes 14a are positioned corresponding to the position of each lock hole 3a. According to this embodiment, the number of insertion hole 14a is four and corresponding number (four) of the lock holes 13a are positioned to oppose the insertion holes 14a for engagement therewith.

A plurality of insertion holes 16a is provided at the bent wall 16 (right side as viewed in FIG. 1) and each hole is separated with the predetermined distance apart from one another in a longitudinal direction. According to this embodiment, the number of insertion hole 16a is four and positioned to oppose the insertion holes 14a for engagement therewith.

A rectangular through-hole 15a is formed at the top wall 15 (cover wall portion). The through-hole 15a is positioned opposing to the holes 14a in a longitudinal direction. A pair of plate support brackets 21 and 22 is fastened to the upper surface of the top wall 15 of the upper rail 4 opposing to the through-hole 15a by means of rivets 23. The plate support brackets 21 and 22 are provided with bearing pieces 21a and 22a, respectively corresponding to the front edge and the rear edge of the through-hole 15a. These bearing pieces 21a and 22a are positioned opposing to each other in a longitudinal direction of the upper rail 4.

A plate shaped lock lever 26 is rotatably supported on the support brackets 21 and 22 through lock lever pins (not shown) to be inserted into the bearing pieces 21a and 22a. The lock lever 26 serves as the lock member. The lock lever 26 includes a rectangular main body portion 26a the length of which is shorter than the distance between the two bearing pieces 21a and 22a in the longitudinal direction and a pair of support pieces 26b extending and bent from both ends of the main body 26a. The lock lever 26 is rotatably supported on the plate support brackets 21 and 22 and the lock lever pins are inserted therein together with the bearing pieces 21a and 22a.

A plurality of lock pawls 26c is formed on the lock lever 26 and each pawl 26c is separately formed with a distance apart from one another. The lock pawl 26c extends from the main body 26a upwardly and bent outwardly. These lock pawls 28c are guided into the rail section of the upper rail 4 via the through-hole 15a.

Each lock pawl 26c is arranged on the lock lever 26 detachably relative to the insertion holes 14a and 16a when rotated about the lock lever pin (not shown). The relative movement between the lower rail 4 and the upper rail 3 is restricted when the lock pawls 26c is inserted into the lock holes 13a together with the insertion holes 14a and 16a. The upper rail 4 is restricted its movement from the position of the lock lever 26 where the lock pawl 26c is inserted into the last (rear most) one of the lock holes 13a as shown in FIG. 2 to the position where the lock pawl 26c is inserted into the first (front most) one of the lock holes 13a as shown in FIG. 3b every predetermined interval. Thus the position of the seat 5 supported by the upper rail 4 can be determined.

On the contrary, the relative movement between the upper and lower rails can be allowed when the lock pawl 26c is in turn disengaged from the insertion hole 16a and lock hole 13a.

A contact piece 26d is formed at the lock lever 26. The contact piece 26d extends from the main body 26a upwardly and engages with one end of a rod shape lock spring 27. The other end of the spring 27 engages with the upper rail 4. The lock lever 26 is always urged in a direction in which the lock pawl 26c is inserted into the insertion hole 14a. When the operation force of the release handle 6 is transmitted to the lock lever 26 via a connecting rod 28, the lock lever 26 is rotated to have the lock pawl 26c retracted from the insertion hole 14a by overcoming the spring force of a lock spring 27. Then the relative movement between the upper and lower rails is allowed. When the normal seat slide operation is performed for adjusting the seat position, the operation force of the release handle 6 is applied preceding to the movement of the upper rail 4 to allow the relative movement between the upper and lower rails as mentioned above.

An L-shaped support bracket plate 29 is fastened to the upper surface of the top wall 15. A memory piece 31 is provided at the bottom wall 12 of the lower rail 3. The width of the memory piece 31 is shorter than the distance between the bent walls 13 and includes a slider 32 having a box shape. The slider 32 rolls on the bottom 12 in a longitudinal direction through a plurality of balls 33. The slider 32 includes an insertion hole 32a having an inner diameter approximately equal to that of engaging hole 12a and the insertion hole 32a is inserted through the bottom wall of the engaging hole 12a as shown in FIG. 2b. A contact piece 32b is provided at each side in a width direction of the slider 32 and extends front ward.

A coil spring 34 is accommodated in the slider 32 and an engaging member 35 is mounted on the slider 32. The engaging member 35 includes a quadrangular flange 35a, an engaging pin 35b (the other end of the engaging member 35) projecting downwardly from the quadrangular flange 35a and a quadrangular contact portion 35c (one end of the engaging member 35) projecting upwardly from the quadrangular flange 35a. The upper rear end of the contact portion 35c is chamfered to form a guide surface 35d.

The engaging member 35 is inserted into the coil spring 34 at the engaging pin 35b and the contact portion 35c is urged to be projected beyond the slider 32 by the coil spring 34. The tip end of the engaging pin 35b is set to be positioned not to be engaged with the insertion hole 32a and the memory piece 31 is freely movable in a longitudinal direction of the lower rail 3.

When the engaging member 35 moves underside of the engaging pin 35b overcoming the spring force of the coil spring 34, the tip end of the engaging pin 35b is inserted into the insertion hole 32a and the engaging hole 12a and engaged with the engaging hole 12a. The memory piece 31 is engaged with the lower rail 3 and restricted its movement.

As shown in FIG. 2a, an L-shaped stopper 36 is fixed to the upper surface of the bottom wall 12 of the lower rail 3 so that the upper rail 4 can pass through its movement course but memory piece 31 cannot pass its movement course in the longitudinal direction. The memory piece 31 engages with the stopper 36 between the contact pieces 32b when the memory piece 31 moves forward (towards one end side of the lower rail in a longitudinal direction) along the lower rail 3. The memory piece 31 is positioned so that the engaging hole 12a is open to the underside of the engaging pin 35b. Accordingly, the memory piece 31 is fixed to the lower rail 3 when the engaging member 35 moves downward overcoming the force of coil spring.

A receiving portion 37 (a second receiving portion) is fixed to each sidewall 14 provided inwardly in a width direction so that the movement course of the lower rail 3 is not interfered with the stopper 36. Each receiving portion 37 is provided at front side of the memory piece 31 and the L-shape arrangement can interfere the movement of the memory piece 31 in a longitudinal direction of the upper rail 3. The upper rail 4 is engaged with the memory piece 31 by contacting the contact piece 32b when the upper rail 4 moves along the lower rail 3. The receiving portion 37 is disengaged from the memory piece 31 (contact pieces 32b) when the upper rail 4 moves along the lower rail 3. The memory piece 31 is arranged in an disengaging direction from the lower rail 3.

An elongated memory plate 38 is fixed to the inside of the upper rail 4. The memory plate 38 extends in a longitudinal direction. Front end of the memory plate 38 is arranged behind the receiving portion 37 to form a bent portion 38a as a first receiving portion bent upwardly from the main body. This bent portion 38a is urged by the coil spring 34 to be positioned at the same height position with the contact portion 35c of the engaging member 35. The memory plate 38 further includes pressing portion 38b provided consecutively with the bent portion 38a at the flat surface. Press forming forms the bent portion 38a and the pressing portion 38b integrally with the upper rail 4.

Accordingly, the memory piece 31 moves in a longitudinal direction in association with the movement of the lower rail 4 when the normal seat sliding operation by applying the operation force by the release handle 6 under the memory piece 31 being in contact with the receiving portion 37 at the contact piece 32b and in contact with the bent portion 38a at the contact portion 35c.

Figure 3A:
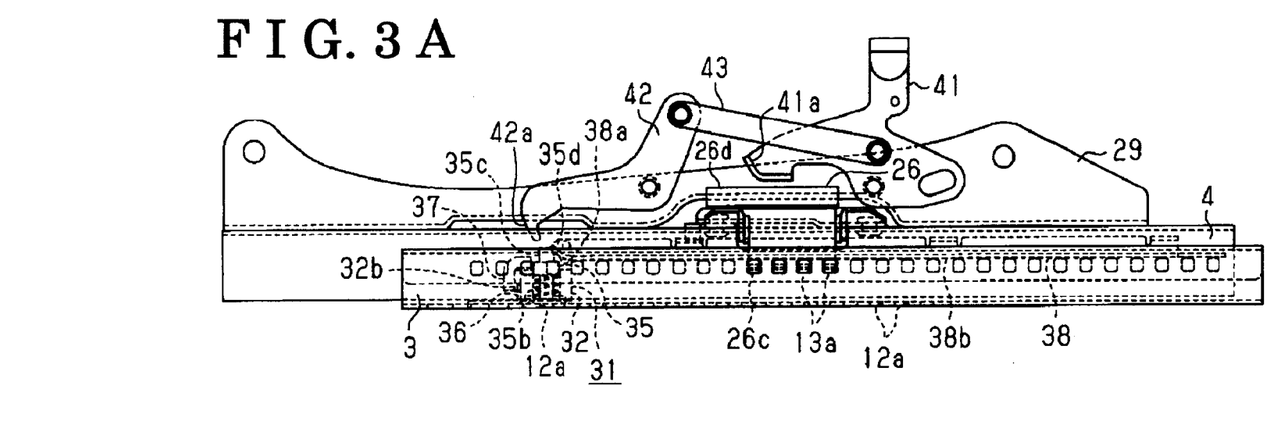
FIG. 3a is a side view similar to FIG. 2a, but showing an operational view of the embodiment.
Figure 3B:
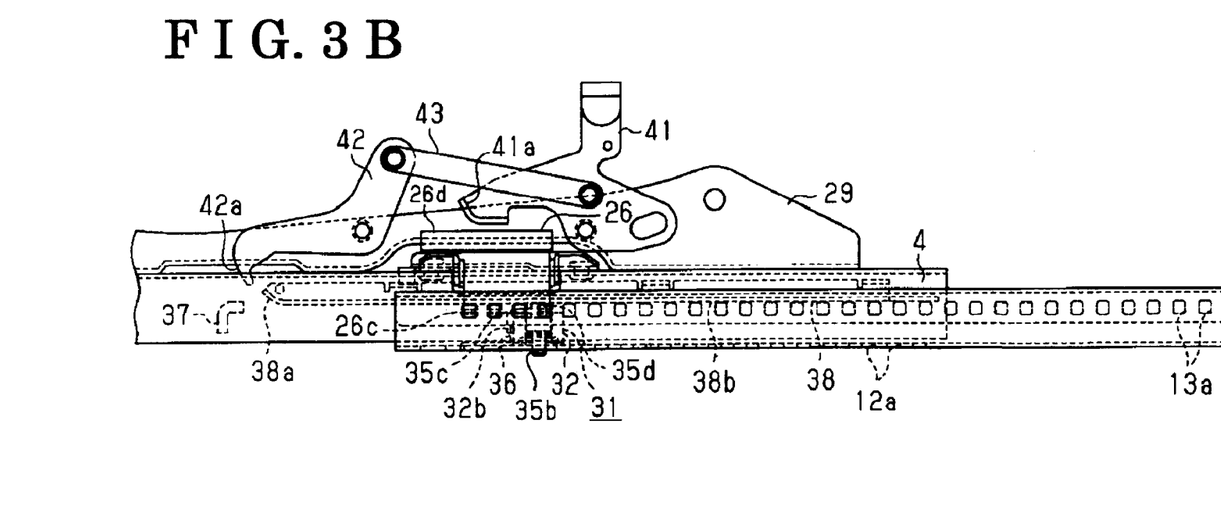
FIG. 3b is a side view similar to FIG. 2a, but showing another operational view of the embodiment.

As shown in FIG. 3a or FIG. 3b, when the memory piece 31 is engaged with the stopper 36 and restricted its further forward movement, the upper rail 4 moves further forward and the guide surface 35d of the engaging member 35 is pressed by the bent portion 38a. The engaging member 35 moves downward overcoming the force of coil spring 34 guided by the bent portion 38a. The top end of the engaging pin 35b is then inserted into the insertion hole 32a and engaging hole 12a. This will fix the memory piece 31 to the lower rail 3 to restrict the movement thereof.

Next, when the upper rail 4 moves further frontward, the top end of the engaging pin 35b is kept in the insertion hole 32a and the engaging hole 12a since the contact portion 35c of the engaging member 35 is pressed by the pressing portion 38b. The memory piece 31 is accordingly kept to be fixed to the lower rail 3. In other words, the upper rail 4 can be further movable forwardly leaving the memory piece behind. The upper rail 4 can be movable to the front most position as shown in FIG. 3b. The upper rail 4 moves with the predetermined interval The seat 5 also can be adjusted the position relative to the floor 2 in a longitudinal direction of the vehicle.

After that, when the upper rail 4 moves rearward, the engaging member 35 is disengaged from the memory plate 38 (pressing portion 38b) at the contact portion 35c and then the engaging member 35 is urged by the coil spring 34 to move upwardly to release the engagement between the engaging pin 35b and the insertion hole 32a and the engaging hole 12a. The memory piece 31 becomes in contact with the receiving portion 37 at the contact piece 32b to keep the memory piece 31 at the receiving portion 37 and the bent portion 38a. The lower rail 3 further moves in a longitudinal direction in association with the further rearward movement of the upper rail 4.

When the upper rail 4 is positioned at any point that the relative movement between the lower and the upper rails is restricted by the lock lever 26 between the rear most position as shown in FIG. 2 and the middle position shown in FIG. 3a, the memory piece 31 becomes in contact with the receiving portion 37 at the contact piece 32b and in contact with the bent portion 38a at the contact portion 35c (guide surface 35d). The engaging hole 12a is open underside of the contact portion 35c. In other words, the memory piece 31 can be fixed to the lower rail 3 at any position where the relative movement between the upper and lower rails 4 and 3 is restricted and the forward movement of the memory piece 31 is restricted by the stopper 36.

A shoe shaped plate type release lever 41 is rotatably connected by the rear end of the support bracket 29. The release lever 41 includes a contact piece 41a bent in a width direction and a contact piece 26d of the lock lever 26 arranged within the rotational movement course of the contact piece 41a. The release lever 41 is always urged by a spring (not shown) in a direction where the contact piece 41a is separated from the contact piece 26d (in clockwise direction as viewed in FIG. 2). The release lever 41 is rotated in counterclockwise direction about the rotation axis in association with the frontward reclining movement of the seatback 8 and the contact piece 26d is pressed at the contact piece 41a to release the restriction of the lock lever 26.

A memory piece release lever 42 is rotatably connected to the support bracket 29 at the middle portion. The memory piece release lever 42 is a hook shaped plate. One end of a rod type connection lever 43 is rotatably connected to the memory piece release lever 42 and the other end of the connection lever 43 is rotatably connected to the release lever 41. The memory piece release lever 42 is rotated in a counterclockwise direction about the rotation axis as shown in FIG. 2 when the release lever 41 is rotated upon seatback forward reclining operation.

As shown in FIG. 2, the memory piece release lever 42 is formed with a pressing piece 42a with a sharp front edge and a space is provided between the receiving portion 37 and the bent portion 38a on the rotational movement course of the pressing piece 42a. The memory piece 31 becomes in contact with the receiving portion 37 at the contact piece 32b and at the same time becomes in contact with the bent portion 38a at the contact portion 35c (guide surface 35d). When the seatback 8 is not reclined, the pressing piece 42a is disengaged from the contact portion 35c. Under this condition, when the seatback 8 is reclined forwardly, to rotate the memory piece release lever 42 in a counterclockwise direction as viewed in FIG. 2, the memory piece 31 is pressed by the pressing piece 42a at the contact portion 35c. Then the engaging member 35 moves downwardly overcoming the coil spring 34 to be fixed to the lower rail 3. At this time, the restriction of the relative movement between the upper and lower rails 4 and 3 is released by pressing the contact piece 26d.

When the upper rail 4 is moved forward, the memory piece 31 is pressed by the pressing portion 38b at the contact portion 35c and is kept to be fixed to the lower rail 3. Thus the upper rail 4 moves further forward leaving the memory piece 31.

When the upper rail 4 is positioned at any point that the relative movement between the lower and the upper rails is restricted by the lock lever 26 between the rear most position as shown in FIG. 3a and the middle position, the memory piece 31 becomes in contact with the receiving portion 37 at the contact piece 32b and in contact with the bent portion 38a at the contact portion 35c (guide surface 35d). The memory piece 31 can be fixed to the lower rail 3 (bottom wall 12) and the movement is restricted. At the same time the relative rotation between the upper and lower rails 4 and 3 by the lock lever 26 is released.

Accordingly, the upper rail 4 can be forwardly movable leaving the memory piece 31. On the other hand, when the memory piece 31 is moved rearward until the memory piece 31 is supported by the engagement between the receiving portion 37 with the contact piece 32b, in other words, until the memory piece 31 engages with the receiving portion 37 and the bent portion 38a, the upper rail 4 returns to the original memorized position.

Figure 4A:
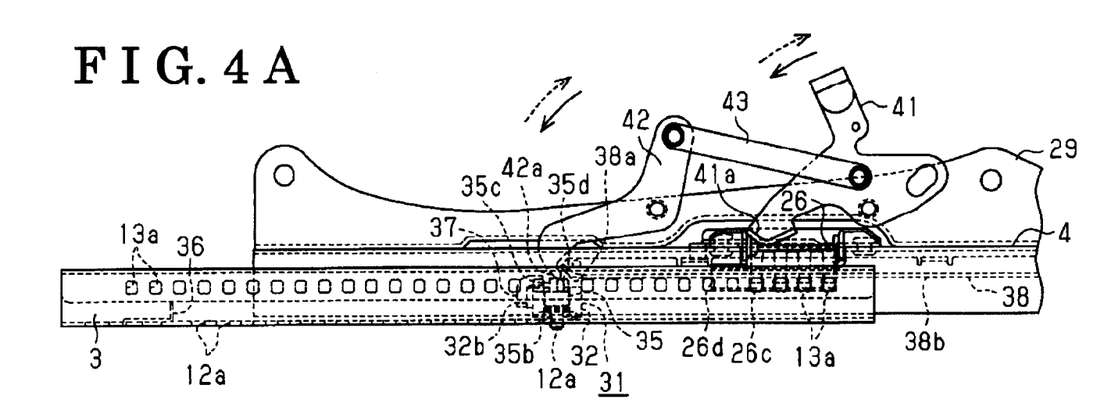
FIG. 4a is a side view similar to FIG. 2, but showing a still further operational view of the embodiment.

Referring now to the walk-in operation, the lock lever 26 is released and/or held in association with the forward reclining operation of the seatback 8. When the upper rail 4 is under the condition that the relative movement with respect to the lower rail 3 is restricted at a predetermined memory position as shown in FIG. 2, if the seatback 8 is reclined forward, the release lever 41 and the memory piece release lever 42 are rotated in a counterclockwise direction as shown in FIG. 4a. The release lever 41 presses the contact piece 26d at the contact piece 41a to release the restriction of the relative movement between the upper and lower rails by the lock lever 26. At the same time, the memory piece 31 is fixed to the lower rail 3 (bottom wall 12) by pressing the contact portion 35c of the engaging member 35 at the pressing piece 42a.

Figure 4B:
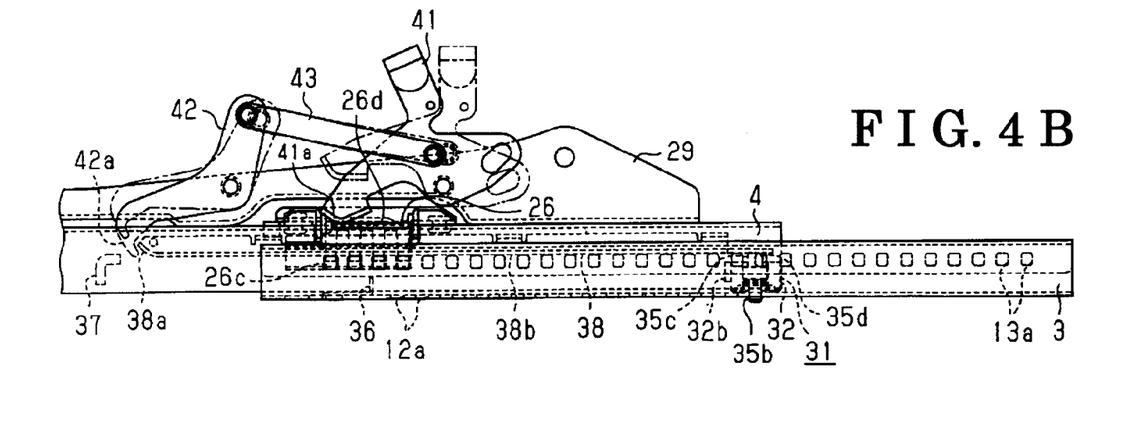
FIG. 4b is a side view similar to FIG. 2a, but showing still another embodiment; and, FIG. 5 is a side view of a vehicle seat.

Under this condition, when the upper rail 4 moves forward, the memory piece 31 is kept to be fixed to the lower rail 3 (bottom wall 12) by pressing the contact portion 35c by the pressing portion 38b. As shown in FIG. 4b, since the memory plate 38 (pressing portion 38b) extends up to the rear end of the upper rail 4, this condition continues even after the upper rail 4 reaches to the front most position. A space can be formed at the rearward of the seat 5 (seatback 8) for allowing an occupant to easily enter into the rear side seat. The movable range of the memory piece 31 is set so that the lower rail 3 is positioned further forward than the rear end of the upper rail 4 even if the upper rail 4 moves to the most front side relative to the lower rail 3. The memory piece 31, thus, does not extend beyond the rear end of the upper rail 4.

When the seatback 8 is returned to the original position from the forward reclined position, the release lever 41 is rotated in a clockwise direction together with the memory piece release lever 42 as shown in FIG. 4b with a two-dot chain line to release the engagement between the contact piece 41a and the contact piece 26d of the lock lever 26. The lock pawl 26c of the lock lever 26 is inserted into the front most lock hole 13a to restrict the relative movement between the upper and lower rails at the front-most portion.

On the other hand, if the upper rail 4 is moved rearward keeping the seatback 8 to be in forward reclined position, the upper rail 4 returns to its original position, in other words, to the memory position where the contact piece 32b engages with the receiving portion 37. As mentioned, the memory position can be selectable until the memory piece 31 is restricted its forward movement by the stopper 36.

As explained, according to the embodiment of this invention, when the seat is under the walk-in operation, i.e., when the lock lever 26 is released or locked in association with the forward reclining movement of the seatback 8, the memory piece 31 is engaged with the lower rail 3 to be fixed to the lower rail 3 by being pushed by the pressing portion 38b. Thereafter, the upper rail 4 is moved to the position where the memory piece 31 is held by the engagement between the receiving portion 37 and the bent portion 38a to return the upper rail to the original memory position. The memory piece 31 is fixed to the lower rail 3 by the pressing portion 38b, even if the memory piece 31 is engaged with the stopper 36 on the moving course of the memory piece 31. Accordingly, when the handle 6 is operated to release the lock lever 26 for adjusting the seat position (as a normal seat adjusting operation), the upper rail 4 moves further forward leaving the memory piece, even if the memory piece is engaged without restricting the movement of the upper rail 4 to assure the movable range.

According to the embodiment, since the memory piece 31 is restricted its forward movement by the stopper 36, too much returning of the upper rail 4 to the memory position can be avoided. This can help the occupant for the seat 5 getting on/off operation by properly providing the space for such operation.

According to the embodiment the memory piece 31 secured to the lower rail 3 will not be positioned rearward of the rear end of the upper rail 4. Thus, the contact of the memory piece 31 with the occupant of the seat can be prevented and the outer appearance of the seat structure can be improved due to the non-outward exposure of the memory piece.

According to the embodiment, the memory plate 38 (pressing portion 38b) extends to the rear end of the upper rail 4 and accordingly, even when the upper rail 4 moves to the front most position relative to the upper rail upon walk-in operation, the memory piece 31 can be fixed to the lower rail 3.

According to the embodiment, the memory position of the upper rail 4 can be maintained by the memory piece 31 to an extent. This can be the same even when the upper rail 4 is short or the memory piece 31 does not move with a sufficient length by limiting the movable range of the memory piece 31 (movable range of the memory position of the upper rail 4).

According to the embodiment, since the memory piece 31 is accommodated in the lower rail 3 limiting the movement thereof, the structure can be simplified without providing the memory piece 31 outside of the lower rail 3 to assure the movement amount of the upper rail 4 or providing separately rail member for the memory piece 31. The contact of the memory piece 31 with the occupant of the seat can be prevented and the outer appearance of the seat structure can be improved due to the non-outward exposure of the memory piece.

According to the embodiment, the movement amount of the upper rail is not limited by the memory function at the position of the upper rail 4 to be easily applicable to any type with- or without memory function.

The embodiment explained above can be modified as follows:

The stopper 36 can be formed integrally with lower rail instead of forming separately. The stopper 36 can be omitted. When the memory piece 31 is engaged with an obstacle such as a fastening bolt on the lower rail 3 in the moving course of the memory piece 31, the memory piece 31 can be fixed to the lower rail 3 by the force of the pressing portion 38b. When the normal sliding operation using the release handle 6 to adjust the position of the seat 5, the upper rail can be moved forward leaving the memory piece 31 engaged with the obstacle. Accordingly, the upper rail 4 can be movable even when the memory piece 31 is engaged with the obstacle on the moving course to assure the moving amount of the upper rail 4. Even when the obstacle (fastening bolt or the like) is in a different position, the memory position of the upper rail 4 can be changed without changing the moving amount of the upper rail. This can improve the versatility of the device.

The bent portion 38a can be substituted by an inclined flat surface inclining upwardly.

The memory plate is extending to the rear end of the upper rail so that the memory piece 31 can be fixed to the lower rail even when the upper rail moves front most position relative to the lower rail upon walk-in operation.

The principles, preferred embodiment and mode of operation of the present invention have been described in the foregoing specification. However, the invention, which is intended to be protected, is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat slide device for a vehicle comprising:
a lower rail which is mounted on a vehicle floor;
an upper rail which is mounted on a vehicle seat and movable relative to the lower rail;
a lock member which locks the relative movement between the lower rail and the upper rail;
a memory piece mounted in the lower rail which is engageable with and disengageable from the lower rail; and
a first receiving portion provided on the upper rail and moves the memory piece in a relative movement direction of the upper rail by following the movement of the upper rail by contacting with the memory piece and allows the memory piece to move relative to the upper rail by releasing the contact with memory piece; and
an engaging portion provided on the upper rail which engages the memory piece with the lower rail by contacting with the memory piece in association with the frontward reclining movement of a seatback of the vehicle seat and allows the memory piece to move relative to the lower rail by releasing the contact with the memory piece in association with the relative movement between the lower rail and the upper rail when the seatback returning from the frontward reclining condition to an original position.

2. The seat slide device for a vehicle according to claim 1, further comprising:
a memory plate secured to the upper rail and forms thereon the first receiving portion and the engaging portion.

3. The seat slide device for a vehicle according to claim 1, further comprising:
a second receiving portion provided on the upper rail and sandwiches the memory piece in a relative movement direction of the upper rail in cooperation with the first receiving portion by contacting with the memory piece and allows the memory piece to move by following the movement of the upper rail.

4. The seat slide device for a vehicle according to claim 1, further comprising:
a stopper provided on the lower rail and limits a movement of the memory piece from a predetermined position toward one end side of the lower rail in a longitudinal direction in the relative movement direction of the upper rail by contacting the memory piece.

5. The seat slide device for a vehicle according to claim 4, wherein a movable range of the memory piece relative to the lower rail is set to be the range between the other end side of the lower rail in the longitudinal direction and the stopper when the upper rail is moved toward the one side of the lower rail relative to the lower rail.

6. The seat slide device for a vehicle according to claim 2, wherein the lower rail includes a pair of side walls and a bottom wall which connects the pair of side walls to each other, the upper rail includes a pair of side walls and a cover wall which connects the pair of side walls to each other, the memory plate is positioned between the pair of side walls of the upper rail, and wherein the memory piece includes a slide body slidably supported on the bottom wall of the lower rail in a longitudinal direction of the lower rail and provided between the pair of side walls of the upper rail, an engaging body formed on the slide body and allowing contact with the memory plate at one end thereof and engageable with the bottom wall of the lower rail at the other end thereof and a spring accommodated in the slide body and always urges the engaging body toward the direction where the engaging body is disengaged from the lower rail.

7. The seat slide device for a vehicle according to claim 6, further comprising a guide surface formed at one end of the engaging body and allows contact with the first receiving portion of the memory plate.

8. The seat slide device for a vehicle according to claim 6, further comprising:
a support bracket fixed to the cover wall of the upper wall;
a release lever rotatably supported on the support bracket and releasing the restriction of the relative movement between the lower rail and the upper rail by the lock member in association with a frontward reclining movement of the seatback;
a memory piece release lever operatively connected with the release lever and engages the engaging body with the lower rail by pressing one end of the engaging body of the memory piece overcoming the biasing force of the spring under the restriction condition of the relative movement between the lower rail and the upper rail by rotational operation of the release lever being released; and a release handle provided separately from the release lever and connected to the lock member which releases the restriction of the relative movement between the lower rail and the upper rail by the lock member.

9. A seat slide device for a vehicle comprising:

a lower rail which is mounted on a vehicle floor;

an upper rail which is mounted on a vehicle seat and movable relative to the lower rail;

a lock member which locks the relative movement between the lower rail and the upper rail;

a memory piece mounted in the lower rail which is engageable with and disengageable from the lower rail;

a first receiving portion provided on the upper rail and moves the memory piece in a relative movement direction of the upper rail by following the movement of the upper rail by contacting with the memory piece and allows the memory piece to move relative to the upper rail by releasing the contact with memory piece; and an engaging portion provided on the upper rail which engages the memory piece with the lower rail by contacting with the memory piece and allowing the memory piece to move relative to the lower rail by releasing the contact with memory piece.

* * * * *